United States Patent [19]
Buczkowski

[11] 3,822,507
[45] July 9, 1974

[54] WINDOW SASH HOLDER

[76] Inventor: Louis A. Buczkowski, 1332 E. 7th St., Erie, Pa. 16503

[22] Filed: June 13, 1972

[21] Appl. No.: 262,307

[52] U.S. Cl. .................................. 49/417, 49/421
[51] Int. Cl. ............................................. E05d 13/08
[58] Field of Search ........................... 49/414–417, 49/419, 421, 451; 292/74, 163, 176, 155, DIG. 19, DIG. 73

[56] References Cited
UNITED STATES PATENTS

| 174,889 | 3/1876 | Adams | 49/417 |
| 1,115,576 | 11/1914 | Robertson | 49/417 X |
| 1,171,645 | 2/1916 | Reinert | 49/421 |
| 2,017,299 | 10/1935 | Vikre | 49/417 |

FOREIGN PATENTS OR APPLICATIONS

| 215,889 | 5/1924 | Great Britain | 292/74 |

Primary Examiner—Kenneth Downey

[57] ABSTRACT

A holder for a window sash made up of a slide rail strip attached to a window frame and a spring loaded brake mechanism attached to the window sash. The brake mechanism has a housing, which contains a spring, a brake shoe, and a brake lining. The brake lining is frictionally engaged with the slide rail strip and the brake shoe is spring loaded toward the slide rail strip so that the brake frictionally holds the window in position. An adjusting screw engages the spring by which the spring tension on the brake may be adjusted. The adjusting screw varies the frictional resistance of the window and therefore its resistance to movement can be adjusted.

1 Claim, 2 Drawing Figures

PATENTED JUL 9 1974　　　　　　　　　　　3,822,507

WINDOW SASH HOLDER

OBJECTS OF THE INVENTION

It is an object of the invention to provide an improved brake for supporting a window sash.

Another object of the invention is to provide a window holder that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
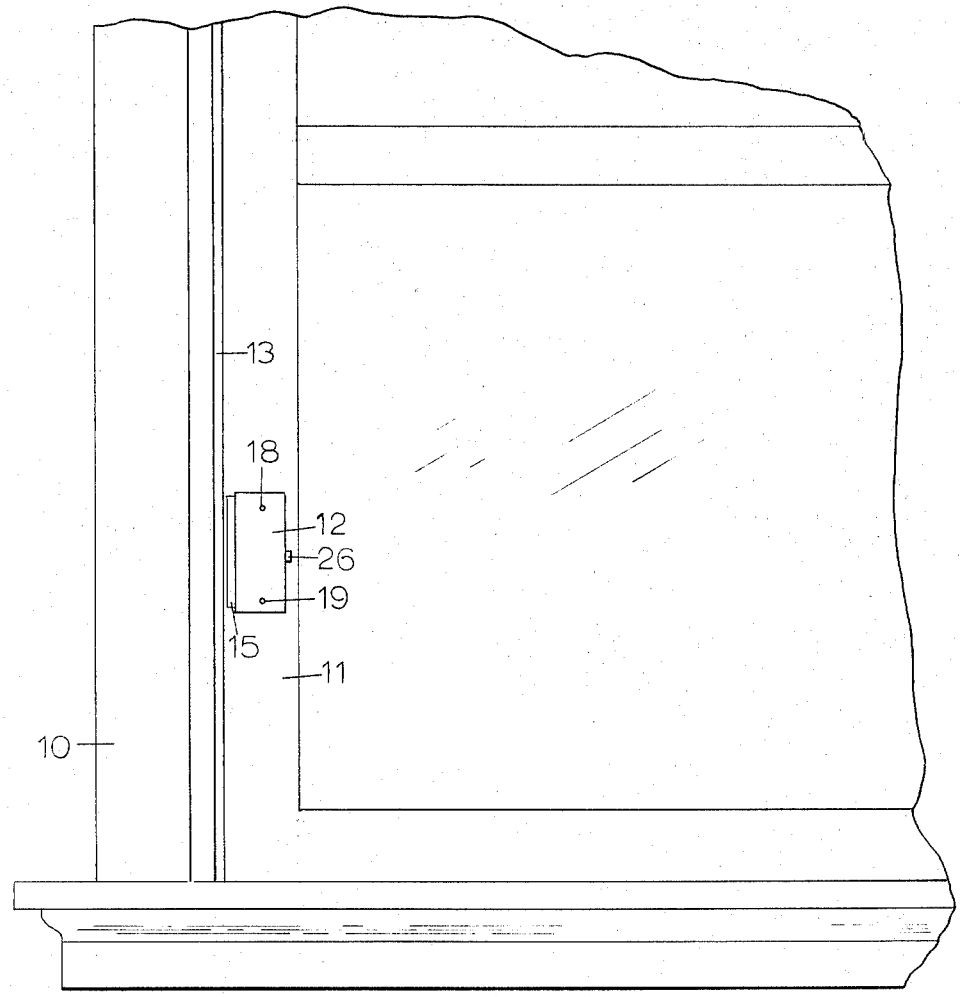
FIG. 1 is a partial view of a window and sash showing the window holder according to the invention.
Figure 2:
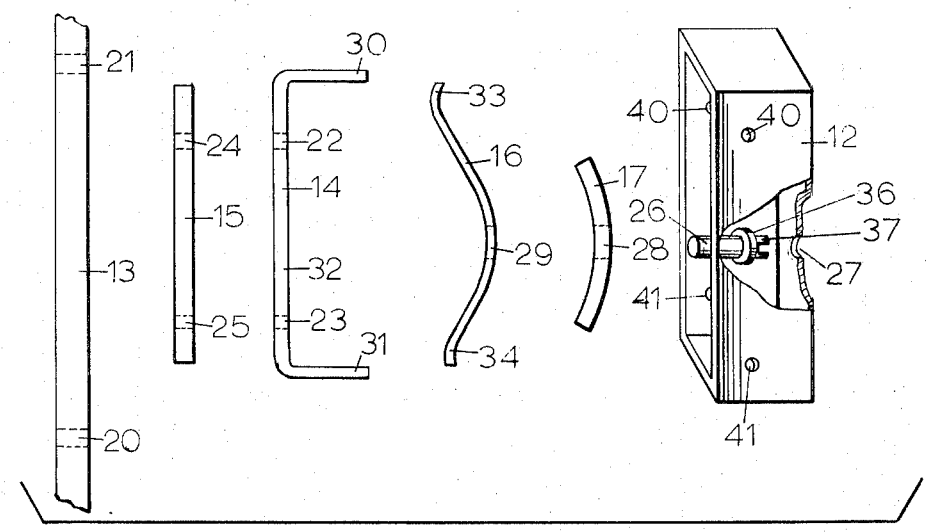
FIG. 2 is an exploded side view of the several parts of the window holder according to the invention.

Now with more particular reference to the drawings, the window frame 10 is of a conventional type having a sliding sash 11 that slides up and down in the frame 10 in the conventional manner of a double hung window. The sash 11 has a housing 12 fixed to it by means of the two mounting screws 18 and 19, which are received in the mounting screw holes 40 and 41. The housing 12 receives the brake shoe 14 that has the brake lining 15 fixed to it. The brake lining 15 engages the slide rail strip 13. The slide rail strip 13 may be of steel and be fixed to the window frame 10 by means of screws supported in the openings 20 and 21. The slide rail strip 13 may extend from the bottom of the window frame 10 to a point near the top. However, the slide rail strip 13 need only extend the distance that sliding sash 11 may be moved plus the length of the window brake housing 12. The housing 12 could be mounted at the top of the sliding sash 11. When the window sash 11 is in a completely closed position, the slide rail strip 13 would extend to the lower end of the brake housing 12. The slide rail strip 13 would extend upwardly to the top of the window frame 10. This embodiment of the invention is less conspicuous as the rail 13 and housing 12 can be concealed behind drapes, shades and so on. The window brake housing 12 can also be mounted at the bottom of the sliding sash 11. In this embodiment of the invention the slide rail strip 13 would extend to the lower end of the brake housing 12 when the window sash 11 is in a completely closed position. The slide rail strip 13 would extend upwardly the height of the sliding sash 11 plus the length of the window brake housing 12. This length includes the position of the window brake housing 12 when the sash 11 is completely closed and when the sash 11 is completely open. The housing 12 may also be mounted in any position between the top and the bottom of window sash 11. In any position of the housing 12, the strip 13 need not be the full length of the window frame 10. The maximum length of the strip 13 is the distance of travel of the window sash 13 plus the length of the housing 12. This results in a savings of material.

The brake shoe 14 is fixed to the lining 15 by means of rivets in holes 22 and 23 in the brake shoe 14 and holes 24 and 25 in the lining 15. Lining 15 is of a woven frictional material. The spring reinforcer 17 is crescent-shaped so that it conforms to the curvature of the spring 16 thereby stiffening the spring. The spring reinforcer 17 may be spot welded or attached by other suitable means to the spring 16.

The adjusting screw 26 threadably engages the spring reinforcer 17 in the hole 28. The adjusting screw 26 also threadably engages the spring 16 in the hole 29. The head of adjusting screw 26 extends through the hole 27 of the housing 12 to provide an external adjusting means for the spring 16 and reinforcer 17. Only the head 37 of the adjusting screw 26 is permitted to extend through the housing 12 by retaining or pressure bearing surface 36. The tension of spring 16 and reinforcer 17 may be adjusted by engaging the head 37 of the adjusting screw 26.

The brake lining 15, brake shoe 14, and spring 16 are all of a width slightly less than the inside width of the housing 12 so that the brake shoe 14 is received in the housing and the legs 30 and 31, which are turned perpendicular to the intermediate part 32 of the brake shoe are slidably received in the housing 12; that is, the overall length of the brake shoe is slightly less than the inside length of the housing 12.

The ends 33 and 34 of spring 16 arch toward the brake shoe and engage the sides of the brake shoe 14 between the legs 30 and 31 and urge the lining 15 toward the strip 13. It will be noted that by adjusting the screw 26, the spring 16 can be moved toward and away from the strip 13 thereby increasing or decreasing the tension of the spring on the brake shoe.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A holder for a window sash, having a vertically disposed metallic slide rail fastened thereto, comprising
   a housing having an open side, sides adjacent said open side, and having a U-shaped brake shoe slidably received in said housing,
   said housing having spaced holes in the sides adjacent said open sides receiving screws for attaching said housing to said window sash with said open side facing said window frame,
   a woven frictional lining on said U-shaped brake shoe adapted to engage said slide,
   a crescent shaped flat spring in said housing having ends engaging said brake shoe for urging said brake shoe toward said slide rail,
   a crescent shaped spring reinforcer resting on said spring and having a threaded opening therein,
   a hole in said spring reinforcer,
   a screw threadably engaging said hole in said spring reinforcer,
   said screw having a head,
   a hole in said housing opposite said open side receiving said screw head whereby said frictional lining may be adjusted toward said slide.

* * * * *